United States Patent
Tian et al.

(10) Patent No.: US 7,120,360 B2
(45) Date of Patent: Oct. 10, 2006

(54) SYSTEM AND METHOD FOR PROTECTING TRAFFIC IN A HUBBED OPTICAL RING NETWORK

(75) Inventors: Cechan Tian, Plano, TX (US); Susumu Kinoshita, Plano, TX (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/031,639

(22) Filed: Jan. 6, 2005

(65) Prior Publication Data
US 2006/0147209 A1 Jul. 6, 2006

(51) Int. Cl.
*H04B 10/00* (2006.01)
(52) U.S. Cl. .......................................... 398/83; 398/79
(58) Field of Classification Search ............ 398/58–64, 398/70–72, 79–88
See application file for complete search history.

(56) References Cited

U.S. PATENT DOCUMENTS

| | | | | |
|---|---|---|---|---|
| 5,414,548 | A | 5/1995 | Tachikawa et al. ......... | 359/130 |
| 5,576,875 | A | 11/1996 | Chawki et al. ............. | 359/125 |
| 5,615,036 | A | 3/1997 | Emura ........................ | 359/124 |
| 5,771,112 | A | 6/1998 | Hamel et al. ............... | 359/128 |
| 5,774,244 | A | 6/1998 | Tandon et al. .............. | 359/125 |
| 5,778,118 | A | 7/1998 | Sridhar ........................ | 385/24 |
| 5,903,371 | A | 5/1999 | Arecco et al. .............. | 359/119 |
| 5,930,016 | A | 7/1999 | Brorson et al. ............. | 359/127 |
| 6,097,696 | A | 8/2000 | Doverspike ................. | 370/216 |
| 6,122,096 | A | 9/2000 | Fatehi ........................ | 359/341 |
| 6,137,608 | A | 10/2000 | White ........................ | 359/128 |
| 6,160,648 | A | 12/2000 | Öberg et al. ................ | 359/110 |
| 6,192,173 | B1 | 2/2001 | Solheim et al. ............. | 385/24 |
| 6,236,498 | B1 | 5/2001 | Freeman et al. ............ | 359/341 |
| 6,295,146 | B1 | 9/2001 | Nathan et al. .............. | 359/119 |
| 6,310,994 | B1 | 10/2001 | Jones et al. ................. | 385/24 |

(Continued)

FOREIGN PATENT DOCUMENTS

EP    0 677 935 A1    4/1995

(Continued)

OTHER PUBLICATIONS

Communication from the European Patent Office, European Search Report for Application No. EP 05 00 1571, Jun. 17, 2005, 3 pages.

(Continued)

*Primary Examiner*—Agustin Bello
(74) *Attorney, Agent, or Firm*—Baker Botts L.L.P.

(57) ABSTRACT

An optical access network includes a first ring and a second ring communicating optical signals in opposite directions. The network also includes an access node coupled to both rings that adds traffic in a first wavelength of a first optical signal communicated on the first ring. Furthermore, the network includes a hub node coupled to each ring and coupled to an optical core network. The hub node receives the first optical signal, forwards a first copy of the signal to a first wavelength blocking unit that terminates the traffic in the first wavelength, and forwards a second copy of the signal to a first network interconnection element that forwards the traffic in the first wavelength to the core network. Furthermore, upon detection of an interruption of the traffic in the first wavelength on the first ring, the access node adds the traffic in a second wavelength of a second optical signal communicated on the second ring. In addition, the hub node receives the second optical signal, forwards a first copy of the signal to a second wavelength blocking unit that terminates the traffic in the second wavelength, and forwards a second copy of the signal to a second network interconnection element that forwards the traffic in the second wavelength to the core network.

17 Claims, 8 Drawing Sheets

U.S. PATENT DOCUMENTS

| | | |
|---|---|---|
| 6,331,906 B1 | 12/2001 | Sharma et al. ............... 359/119 |
| 6,344,911 B1 | 2/2002 | Dailey, Jr. et al. .......... 359/127 |
| 6,351,582 B1 | 2/2002 | Dyket et al. .................. 385/24 |
| 6,426,817 B1 | 7/2002 | Tomita ........................ 359/127 |
| 6,456,406 B1 | 9/2002 | Arecco et al. ............... 359/119 |
| 6,456,407 B1 | 9/2002 | Tammela et al. ............ 359/119 |
| 6,486,988 B1 | 11/2002 | Lewis et al. ................. 359/127 |
| 6,525,852 B1 | 2/2003 | Egnell ......................... 359/127 |
| 6,590,681 B1 | 7/2003 | Egnell et al. ................ 359/127 |
| 6,616,349 B1 | 9/2003 | Li et al. .......................... 398/4 |
| 6,631,018 B1 | 10/2003 | Milton et al. ................ 359/119 |
| 6,658,013 B1 | 12/2003 | de Boer et al. ............. 370/404 |
| 6,701,085 B1 | 3/2004 | Muller |
| 6,895,184 B1 | 5/2005 | Way |
| 2001/0015836 A1 | 8/2001 | Kim et al. ................... 359/124 |
| 2001/0040710 A1 | 11/2001 | Sharrat et al. ............... 359/119 |
| 2001/0050790 A1 | 12/2001 | Graves et al. ............... 359/110 |
| 2002/0003639 A1 | 1/2002 | Arecco et al. ............... 359/119 |
| 2002/0030869 A1 | 3/2002 | Okazaki et al. ............. 359/128 |
| 2002/0067523 A1 | 6/2002 | Way ............................ 359/119 |
| 2002/0101633 A1 | 8/2002 | Onaka et al. ................ 359/119 |
| 2002/0126334 A1 | 9/2002 | Milton et al. ................ 359/110 |
| 2002/0145779 A1 | 10/2002 | Strasser et al. .............. 359/124 |
| 2002/0149817 A1 | 10/2002 | Kiliccote et al. ............ 359/119 |
| 2002/0186439 A1 | 12/2002 | Buabbud et al. ............ 359/173 |
| 2002/0191898 A1 | 12/2002 | Evans et al. .................. 385/24 |
| 2002/0196491 A1 | 12/2002 | Deng et al. .................. 359/124 |
| 2005/0111495 A1 | 5/2005 | Gumaste et al. |

FOREIGN PATENT DOCUMENTS

| | | |
|---|---|---|
| EP | 0 668 674 | 8/1995 |
| EP | 0 716 521 A2 | 6/1996 |
| EP | 0 907 266 A2 | 4/1999 |
| EP | 1 161 014 A1 | 12/2001 |
| EP | 1 265 451 | 12/2002 |
| EP | 1 564 933 | 8/2005 |
| JP | 402141133 | 5/1990 |
| WO | WO 96/32787 | 10/1996 |
| WO | WO 98/52314 | 11/1998 |
| WO | WO 99/03231 | 1/1999 |
| WO | WO 99/65164 | 12/1999 |
| WO | WO 03/104849 | 12/2003 |
| WO | WO 03/104849 A2 | 12/2003 |
| WO | WO 2004/107617 | 12/2004 |

OTHER PUBLICATIONS

Ashmead, "ROADMap for the Metro Market," Fiberoptic Product News, 3 pages (36,38, and 40), Oct. 2001.

Bacque, B. et al., "R-OADM Architecture —Now you can Control the Light," Tropic Networks, pp. 1-11, 2003.

Batchellor, "Optical Networking the Ericsson Way," Ericsson Limited, Business Unit Transport and Cable Networks, pp. 1-4, Feb. 22, 2002.

Boskovic, et al., "Broadcast and Select OADM nodes Application and Performance Trade-offs," OFC, pp. 158-159, 2002.

Chlamtac et al., "Lightpath Communications: An Approach to High Bandwidth Optical WAN's, " *IEEE Transactions on Communications*, vol. 40, No. 7, Jul. 1992, 12 pages.

Grenfeldt, "ERION-Ericsson optical networking using WDM technology, " Ericsson Review No. 3, pp. 132-137,1998.

Kai et al., "Photonic Gateway with µs-Order Wavelength Path Control for Metro Access Networks," ECOC, pp. 512-513, Feb. 24-26, 2004.

Kinoshita et al. "Flexible Metro WDM Network with Photonic Domains", Fujitsu Laboratories of America, Inc., 3 pages.

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Toba, H., et al., "Demonstration of Optical FDM Based Self-Healing Ring Network Employing Arrayed-Waveguide-Granting ADM Filters and EDFAs," NTT Transmission System Laboratories, pp. 263-266, Sep. 24, 1994.

Wolde, J., et al., "Optical Ethernet Metro Access Network Protype: Implementation and Results," ECOC-IOOC 2003, 3 pages, Sep. 21-25, 2003.

Narula-Tam et al., "Efficient Routing and Wavelength Assignment for Reconfigurable WDM Networks," *IEEE Journal on Selected Areas in Communications*, vol. 20, No. 1, Jan. 2002, 14 pages.

Kinoshita et al., U.S. Appl. No. 10/158,523, entitled "Optical Ring Network with Optical Subnets and Method," filed May 29, 2002.

Kinoshita et al., U.S. Appl. No. 10/262,818, entitled "Optical Ring Network with Hub Node and Method," filed May 29, 2002.

Kinoshita, U.S. Appl. No. 10/158,348, entitled "Multiple Subnets in an Optical Ring Network and Method," filed May 29, 2002.

Gumaste et al., U.S. Appl. No. 10/448,169, entitled Optical Ring Network with Selective Signal Regeneration and Wavelength Conversion, filed May 29, 2002.

Takeguchi, U.S. Appl. No. 10/448,169, entitled Optical Upgraded Flexible Open Ring Optical Network and Method, filed Feb. 10, 2004.

Gumaste et al., U.S. Appl. No. 10/722,856, entitled Optical Ring Network with Optical Subnets and Method, filed Nov. 26, 2003.

Communication from the European Patent Office, European Search Report for Application No. EP 04 02 6005, May 3, 2006, 3 pages.

Gumaste et al., "Benefits of Optical Subnets in WDM Ring Networks," First International Conference on Optical Communications and Networks, Nov. 11-14, 2005, World Scientific Singapore, pp. 99-103.

SYSTEM AND METHOD FOR PROTECTING TRAFFIC IN A HUBBED OPTICAL RING NETWORK

TECHNICAL FIELD OF THE INVENTION

The present invention relates generally to optical transport systems, and more particularly to a system and method for protecting traffic in a hubbed optical ring network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The typology in which WDM and DWDM networks are built plays a key role in determining the extent to which such networks are utilized. Ring topologies are common in today's networks. WDM add/drop units serve as network elements on the periphery of such optical rings. By using WDM add/drop equipment at each network element (node), the entire composite signal can be fully demultiplexed into its constituent channels and switched (added/dropped or passed through).

SUMMARY

The present invention provides an optical network having components that provide for protection switching of traffic in a hubbed optical ring network.

In accordance with a particular embodiment of the present invention, an optical access network includes a first ring and a second ring communicating optical signals in opposite directions. The network also includes an access node coupled to both rings that adds traffic in a first wavelength of a first optical signal communicated on the first ring. Furthermore, the network includes a hub node coupled to each ring and coupled to an optical core network. The hub node receives the first optical signal, forwards a first copy of the signal to a first wavelength blocking unit that terminates the traffic in the first wavelength, and forwards a second copy of the signal to a first network interconnection element that forwards the traffic in the first wavelength to the core network. Furthermore, upon detection of an interruption of the traffic in the first wavelength on the first ring, the access node adds the traffic in a second wavelength of a second optical signal communicated on the second ring. In addition, the hub node receives the second optical signal, forwards a first copy of the signal to a second wavelength blocking unit that terminates the traffic in the second wavelength, and forwards a second copy of the signal to a second network interconnection element that forwards the traffic in the second wavelength to the core network.

Technical advantages of one or more embodiments of the present invention may include providing an improved hubbed optical network, such as an access network, coupled to a core network via a hub node. In particular embodiments, such a local access network may include low-cost passive add/drop nodes ("access nodes") and a hub node. In such embodiments, this hub node may provide optically-transparent interconnection of the access network to the core network and may be configurable to provide fault protection for the traffic both between the hub node and the access nodes (i.e., traffic between the access nodes and the core network) and for the traffic between the access nodes.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1:
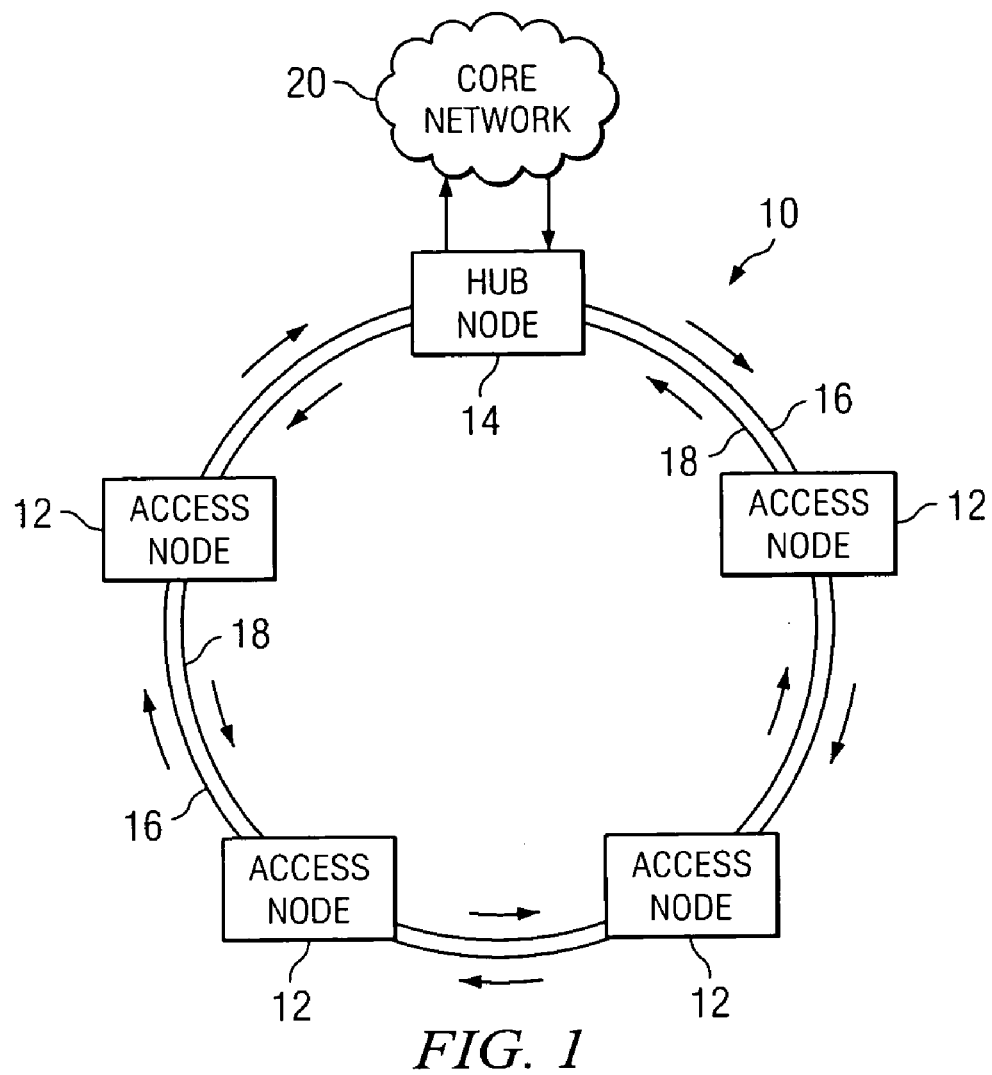
FIG. 1 is a block diagram illustrating an optical network in accordance with one embodiment of the present invention.

FIG. 1 is a block diagram illustrating an optical network 10 in accordance with one embodiment of the present invention. In accordance with this embodiment, the network 10 is an optical ring. An optical ring may include, as appropriate, a single, unidirectional fiber, a single, bi-directional fiber, or a plurality of uni- or bi-directional fibers. In the illustrated embodiment, the network 10 includes a pair of unidirectional fibers, each transporting traffic in opposite directions, specifically a first fiber, or ring, 16 and a second fiber, or ring, 18. Rings 16 and 18 connect a plurality of nodes 12 and 14. Network 10 is an optical network in which a number of optical channels are carried over a common path in disparate wavelengths/channels. Network 10 may be an wavelength division multiplexing (WDM), dense wavelength division multiplexing (DWDM), or other suitable multi-channel network. In the illustrated embodiment, network 10 is a metropolitan access network that includes a number of access nodes 12 and a hub node 14 that interconnects network 10 with a metropolitan core network 20. However, network 10 may be any other suitable network or combination of networks that is coupled to another network or combination of networks via hub node 14.

Referring to FIG. 1, optical information signals are transmitted in different directions on rings 16 and 18. The optical signals have at least one characteristic modulated to encode audio, video, textual, real-time, non-real-time and/or other suitable data. In the illustrated embodiment, the first ring 16 is a clockwise ring in which traffic is transmitted in a clockwise direction. The second ring 18 is a counterclockwise ring in which traffic is transmitted in a counterclockwise direction. Access nodes 12 are each operable to passively add and drop traffic to and from the rings 16 and 18. In particular, each access node 12 receives traffic from local clients and adds that traffic to the rings 16 and 18. At the same time, each access node 12 receives traffic from the rings 16 and 18 and drops traffic destined for the local clients. As used throughout this description and the following claims, the term "each" means every one of at least a subset of the identified items. In adding and dropping traffic, the access nodes 12 may combine data from clients for transmittal in the rings 16 and 18 and may drop channels of data from the rings 16 and 18 for clients. Traffic may be dropped by making the traffic available for transmission to the local clients. Thus, traffic may be dropped and yet continue to circulate on a ring. Access nodes 12 communicate the traffic on rings 16 and 18 regardless of the channel spacing of the traffic—thus providing "flexible" channel spacing in the access nodes 12. "Passively" in this context means the adding or dropping of channels without power, electricity, and/or moving parts. An active device would thus use power, electricity or moving parts to perform work. In a particular embodiment of the present invention, traffic may be passively added to and/or dropped from the rings 16 and 18 by splitting/combining (without multiplexing/demultiplexing) in the transport rings and/or separating parts of a signal in the ring. Further details regarding the access nodes 12 are described below in reference to FIG. 2.

Access nodes 12 are coupled to core network 20 through hub node 14. Hub node 14 thus includes components for receiving traffic from access nodes 12 over rings 16 and 18 and communicating this traffic to core network 20 and components for receiving traffic from core network 20 and communicating this traffic to access nodes 12. Hub node 14 is also operable to either terminate or pass traffic from each access node 12 to prevent traffic from continuously circling around network 10 and to provide for protection switching of the traffic in network 10, when necessary. Further details regarding hub node 14 are described below in reference to FIG. 4A.

Figure 2:
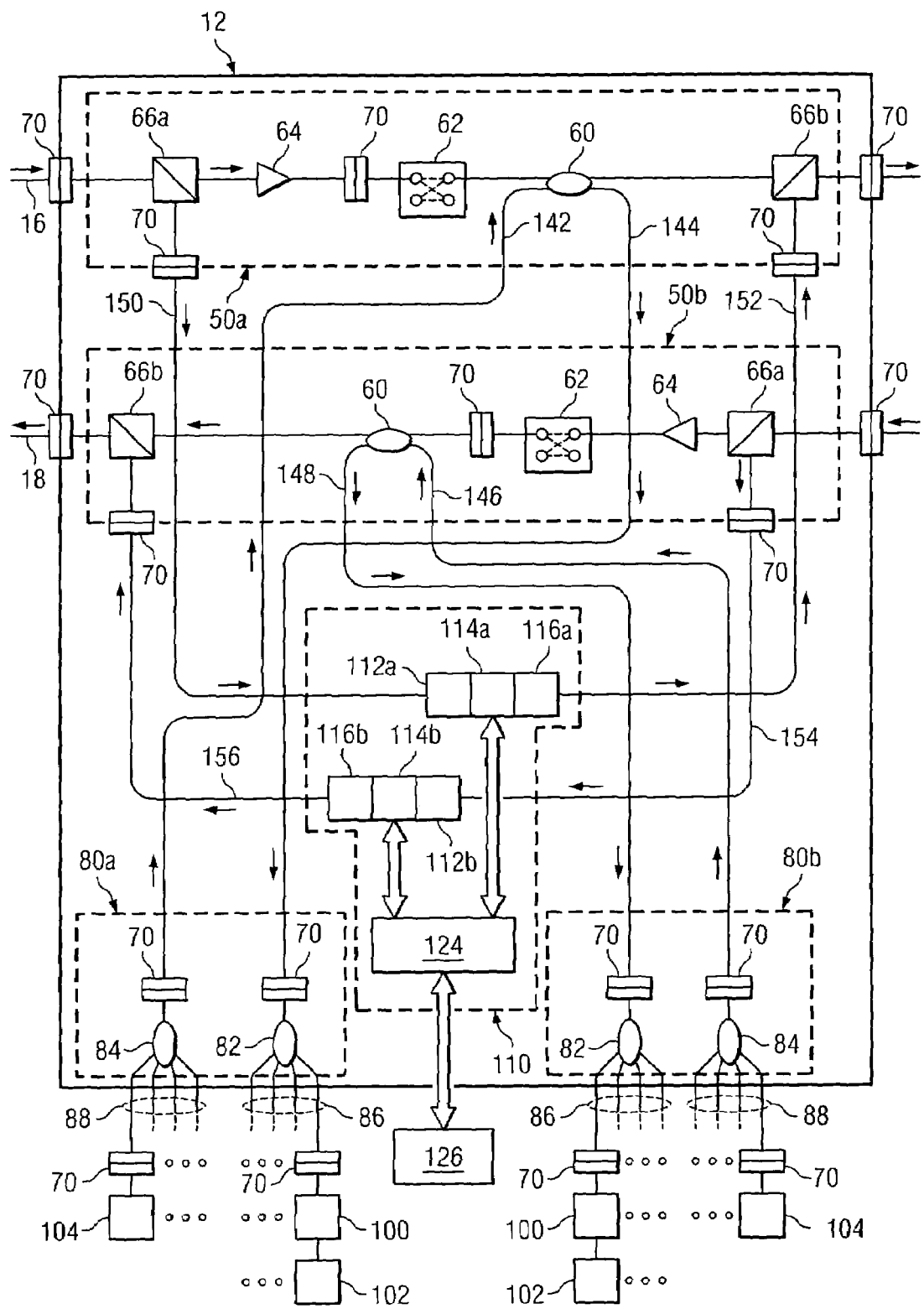
FIG. 2 is a block diagram illustrating details of an access node of the network of FIG. 1, in accordance with one embodiment of the present invention.

FIG. 2 is a block diagram illustrating details of an access node 12 of FIG. 1 in accordance with one embodiment of the present invention. Referring to FIG. 2, the access node 12 comprises counterclockwise transport element 50a, clockwise transport element 50b, counterclockwise distributing/combining element 80a, clockwise distributing/combining element 80b, and managing element 110. In one embodiment, the elements 50, 80, and 110, as well as components within the elements may be interconnected with optical fiber links. In other embodiments, the components may be implemented in part or otherwise with planar waveguide circuits and/or free space optics. Any other suitable connections may alternatively be used. In addition, the elements of access node 12 may each be implemented as one or more discrete cards within a card shelf of the access node 12. Exemplary connectors 70 for a card shelf embodiment are illustrated by FIG. 2. The connectors 70 may allow efficient and cost effective replacement of failed components. It will be understood that additional, different and/or other connectors may be provided as part of the access node 12.

Transport elements 50 are positioned "in-line" on rings 16 and 18. Transport elements 50 may comprise either a single add/drop coupler 60 or a plurality of add/drop couplers 60 which allow for the passive adding and dropping of traffic. In the illustrated embodiment, transport elements 50 each include a single add/drop coupler 60. Alternatively, a separate drop coupler and add coupler can be so that if one of the couplers fail, the other coupler can still add or drop. Although couplers 60 are described, any other suitable optical splitters may be used. For the purposes of this description and the following claims, the terms "coupler," "splitter," and "combiner" should each be understood to include any device which receives one or more input optical signals, and either splits or combines the input optical signal(s) into one or more output optical signals. The transport elements 50 further comprise optical supervisory channel (OSC) filters 66 at the ingress and egress edges of each element, and an amplifier 64 between the ingress OSC filter 66a and the egress OSC filter 66b. Amplifiers 64 may comprise an erbium-doped fiber amplifier (EDFA) or other suitable amplifier. OSC filters 66 may comprise thin film type, fiber grating or other suitable type filters.

Transport elements 50 also each include a ring switch 62 (which may be a 2×2 switch or other switch element) operable to selectively open the associated ring 16 or 18 to prevent the flow of traffic on the ring past the switch 62. In the 2×2 embodiment, the switch 62 includes a "cross" or open position and a "through" or closed position. As described below, switches 62 in particular access nodes 12 may be selectively configured in certain circumstances to enable protection switching.

Distributing/combining elements 80 may each comprise a drop signal splitter 82 and an add signal combiner 84. Splitters 82 may comprise a coupler with one optical fiber ingress lead and a plurality of optical fiber egress leads which serve as drop leads 86. The drop leads 86 may be connected to one or more filters 100 which in turn may be connected to one or more drop optical receivers 102. In particular embodiments in which four drop leads 86 are implemented, splitters 82 may each comprise a 2×4 optical coupler, where one ingress lead is terminated, the other ingress lead is coupled to a coupler 60 via a fiber segment, and the four egress leads are used as the drop leads 86. Although the illustrated embodiment shows four drop leads 86, it should be understood that any appropriate number of drop leads 86 may implemented, as described in further detail below.

Combiners 84 similarly may comprise a coupler with multiple optical fiber ingress leads, which serve as add leads 88, and one optical fiber egress lead. The add leads 88 may be connected to one or more add optical transmitters 104. In particular embodiments in which four add leads 88 are implemented, combiners 84 may each comprise a 2×4 optical coupler, where one ingress lead is terminated, the other ingress lead is coupled to a coupler via a fiber segment, and the four egress leads are used as the add leads 88. Although the illustrated embodiment shows four add leads 88, it should be understood that any appropriate number of add leads 88 may implemented, as described in further detail below. The access node 12 further comprises counterclockwise add fiber segment 142, counterclockwise drop fiber segment 144, clockwise add fiber segment 146, clockwise drop fiber segment 148, which connect the couplers 60 to splitters 82 and combiners 84.

Managing element 110 may comprise OSC receivers 112, OSC interfaces 114, OSC transmitters 116, and an element management system (EMS) 124. access node 12 also comprises OSC fiber segments 150, 152, 154, and 156, that connect managing element 110 to ingress and egress OSC filters 66. Each OSC receiver 112, OSC interface 114, and OSC transmitter 116 set forms an OSC unit for one of the rings 16 or 18 in the access node 12. The OSC units receive and transmit OSC signals for the EMS 124. The EMS 124 may be communicably coupled to a network management system (NMS) 126. NMS 126 may reside within access node 12, in a different node, or external to all of the access nodes 12.

EMS 124 and/or NMS 126 may comprise logic encoded in media for performing network and/or node monitoring, failure detection, protection switching and loop back or localized testing functionality of the network 10. Logic may comprise software encoded in a disk or other computer-readable medium and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 12 and/or 14, and the NMS 126 may thus be omitted as a separate, discrete element. Similarly, the OSC units may communicate directly with NMS 126 and EMS 124 omitted.

In operation, the transport elements 50 are operable to passively add traffic to rings 16 and 18 and to passively drop traffic from rings 16 and 18. The transport elements 50 are further operable to passively add and drop the OSC signal to and from rings 16 and 18. More specifically, each OSC ingress filter 66*a* processes an ingress optical signal from its respective ring 16 or 18. OSC filters 66*a* filters the OSC signal from the optical signal and forwards the OSC signal to its respective OSC receiver 112. Each OSC filter 66*a* also forwards or lets pass the remaining transport optical signal to the associated amplifier 64. Amplifier 64 amplifies the signal and forwards the signal to its associated coupler 60. This assumes that the associated switch 62 is closed. If switch 62 is open, the amplified signal is terminated and does not reach the associated coupler 60.

Each coupler 60 passively splits the signal from the amplifier 64 into two generally identical signals: a through signal that is forwarded to egress OSC filter 66*b* (after being combined with add traffic, as described below), and a drop signal that is forwarded to the associated distributing/combining element 80. The split signals are copies in that they are identical or substantially identical in content, although power and/or energy levels may differ. Each coupler 60 passively combines the through signal with an add signal comprising add traffic from the associated distributing/combining element 80. The combined signal is forwarded from the coupler 60 to its associated OSC egress filter 66*b*. Couplers 60 work for both adding and dropping, so they are very low-loss and simple. If a failure occurs in a coupler 60, the replacement of the coupler affects both adding and dropping. To avoid this, a drop coupler and an add coupler can be cascaded instead of using a single coupler 60.

Each OSC egress filter 66*b* adds an OSC signal from the associated OSC transmitter 116 to the combined optical signal and forwards the new combined signal as an egress transport signal to the associated ring 16 or 18 of network 10. The added OSC signal may be locally generated data or may be received OSC data forwarded through by the EMS 124.

Prior to being forwarded to couplers 60, locally-derived add traffic (from local clients or subscribers, from another network, or from any other appropriate source) is received at a distributing/combining element 80 from one or more of the optical transmitters 104. One or more of the optical transmitters 104 may include one or more components for adjusting the optical output power from the transmitter 104, such as a manual variable optical attenuator. Traffic to be added to ring 18 is received at distributing/combining element 80*a* and traffic to be added to ring 16 is received at distributing/combining element 80*b*. A separate optical transmitter 104 may be used for each wavelength in which traffic is to be added at an access node 12. Furthermore, each add lead 88 may be associated with a different wavelength. Therefore, there may be an transmitter 104 and add lead 88 combination for each separate channel in which traffic is desired to be added at a particular access node 12. Although four add leads 88 for each ring 16 and 18 are illustrated (although four transmitters 104 are not explicitly illustrated), it will be understood that any appropriate number of optical transmitters 104 and associated add leads 88 may be used.

Add traffic from one or more transmitters 104 associated with a particular distributing/combining element 80 is received at the associated combiner 84. The combiner 84 combines the signals from multiple transmitters 104 (if applicable) and forwards the combined add signal to the associated coupler 60 for addition to the associated ring 16 or 18. As described above, this add traffic is then combined with forwarded traffic at coupler 60. Combiner 84 may be a coupler, a multiplexer, or any other suitable device.

In the illustrated embodiment, a separate optical transmitters 104 are described as being associated with each distributing/combining element 80. In such an embodiment, different signals may be communicated over each ring 16 and 18. For example, a first signal can be added in a particular wavelength on ring 16 at an access node 12, and an entirely different signal can be added in the same wavelength on ring 18 by the same access node 12. This is possible since each wavelength has an associated optical transmitter 104 at each distributing/combining element 80.

However, in particular embodiments, the same traffic may be added from an access node 12 on both ring 16 and ring 18 (at the same or at different times). For example, this duplicate traffic may be used to provide fault protection. In such embodiments, two different sets of optical transmitters 104 are not required. Instead, distributing/combining elements 80*a* and 80*b* can share a set of transmitters 104. In such a case, the add signals generated by a particular optical transmitter 104 (add signals in a particular wavelength) may be communicated to the combiner 84 of both distributing/combining element 80*a* and distributing/combining element 80*b*. Thus, the same traffic is added to rings 16 and 18 by the access node 12.

As described above, locally-destined traffic on a ring 16 or 18 is dropped to the associated distributing/combining element 80 using coupler 60. The drop traffic is received at the splitter 82 of the distributing/combining element 80, and the splitter 82 splits the dropped signal into multiple generally identical signals and forwards each signal to an optical receiver 102 via a drop lead 86. In particular embodiments, the signal received by optical receivers 102 may first be filtered by an associated filter 100. Filters 100 may be implemented such that each filter allows a different channel to be forwarded to its associated receiver 102. Filters 100 may be tunable filters (such as an acousto-optic tunable filter) or other suitable filters, and receivers 102 may be broadband receivers or other suitable receivers. Such a configuration allows each receiver 102 associated with a particular ring 16 or 18 to receive a different wavelength, and to forward the information transmitted in that wavelength to appropriate clients. A dropped optical signal passing through a filter 100 is able to be optically forwarded to a client without signal regeneration if the signal does not require such regeneration. As described above with respect to sharing transmitters 104 between two the rings when identical traffic is transmitted on both rings, a receiver 102 may also be shared in such a situation. In this case, a switch may be included in access node 12 to switch either traffic received from ring 16 or from ring 18 to the shared receiver 102 depending upon which signal is the most desirable.

As mentioned above, access node 12 also provides an element management system. EMS 124 monitors and/or controls all elements in the access node 12. In particular, EMS 124 receives an OSC signal from each ring 16 and 18 in an electrical format via an OSC receiver 112 associated with that ring (the OSC receiver 112 obtains the signal via an OSC filter 66a). EMS 124 may process the signal, forward the signal and/or loop-back the signal. Thus, for example, the EMS 124 is operable to receive the electrical signal and resend the OSC signal via OSC transmitter 116 and OSC filter 66b to the next node on the ring 16 or 18, adding, if appropriate, node-specific error information or other suitable information to the OSC.

In one embodiment, each element in an access node 12 monitors itself and generates an alarm signal to the EMS 124 when a failure or other problem occurs. For example, EMS 124 in access node 12 may receive one or more of various kinds of alarms from the elements and components in the access node 12: an amplifier loss-of-light (LOL) alarm, an amplifier equipment alarm, an optical receiver equipment alarm, optical transmitter equipment alarm, or other alarms. Some failures may produce multiple alarms. For example, a fiber cut may produce amplifier LOL alarms at adjacent nodes and also error alarms from the optical receivers. In addition, the EMS 124 may monitor the wavelength and/or power of the optical signal within the access node 12 using an optical spectrum analyzer (OSA) communicably connected to appropriate fiber segments within access node 12 and to EMS 124.

The NMS 126 collects error information from all of the nodes 12 and 14 and is operable to analyze the alarms and determine the type and/or location of a failure. Based on the failure type and/or location, the NMS 126 determines needed protection switching actions for the network 10. The protection switch actions may be carried out by NMS 126 by issuing instructions to the EMS in the nodes 12 and 14.

Error messages may indicate equipment failures that may be rectified by replacing the failed equipment. For example, a failure of an optical receiver or transmitter may trigger an optical receiver equipment alarm or an optical transmitter equipment alarm, respectively, and the optical receiver or transmitter replaced as necessary.

Figure 3:
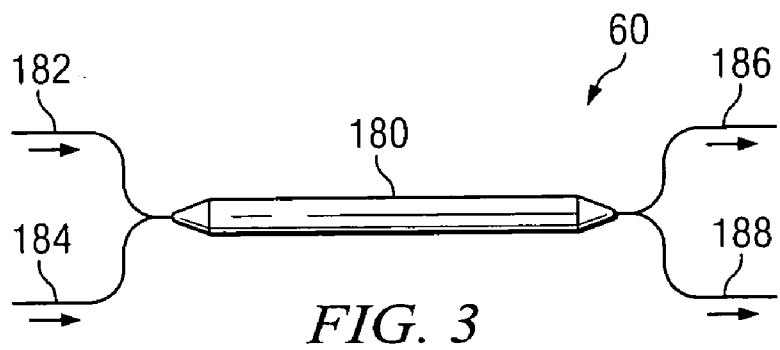
FIG. 3 is a block diagram illustrating details of an optical coupler of the access node of FIG. 2, in accordance with one embodiment of the present invention.

FIG. 3 is a block diagram illustrating details of an optical coupler 60 of access node 12 of FIG. 2, in accordance with one embodiment of the present invention. In this embodiment, the optical coupler 60 is a fiber coupler with two inputs and two outputs. The optical coupler 60 may, in other embodiments, be combined in whole or part with a waveguide circuit and/or free space optics. It will be understood that the coupler 60 may include one or any number of any suitable inputs and outputs, and that the coupler 60 may comprise a greater number of inputs than outputs or a greater number of outputs than inputs.

Referring to FIG. 3, the optical coupler 60 comprises a main body 180, a first ingress segment 182, second ingress segment 184, first egress segment 186, and second egress segment 188. First ingress segment 182 and first egress segment 186 comprise a first continuous optical fiber. Second ingress segment 184 and second egress segment 188 comprise a second continuous optical fiber. Outside of the main body 180, segments 182, 184, 186, and 188 may comprise a jacket, a cladding, and a core fiber. Inside the main body 180, the jacket and cladding may be removed and the core fibers twisted or otherwise coupled together to allow the transfer of optical signals and/or energy of the signals between and among the first and second continuous optical fibers. In this way, the optical splitter/coupler 60 passively combines optical signals arriving from ingress segments 182 and 184 and passively splits and forwards the combined signal via egress segments 186 and 188. A plurality of signals may be combined and the combined signal split by combining and thereafter splitting the combined signal or by simultaneously combining and splitting the signals by transferring energy between fibers. In this manner, the optical splitter/coupler 60 provides flexible channel-spacing with no restrictions concerning channel-spacing in the main streamline.

Figure 4A:
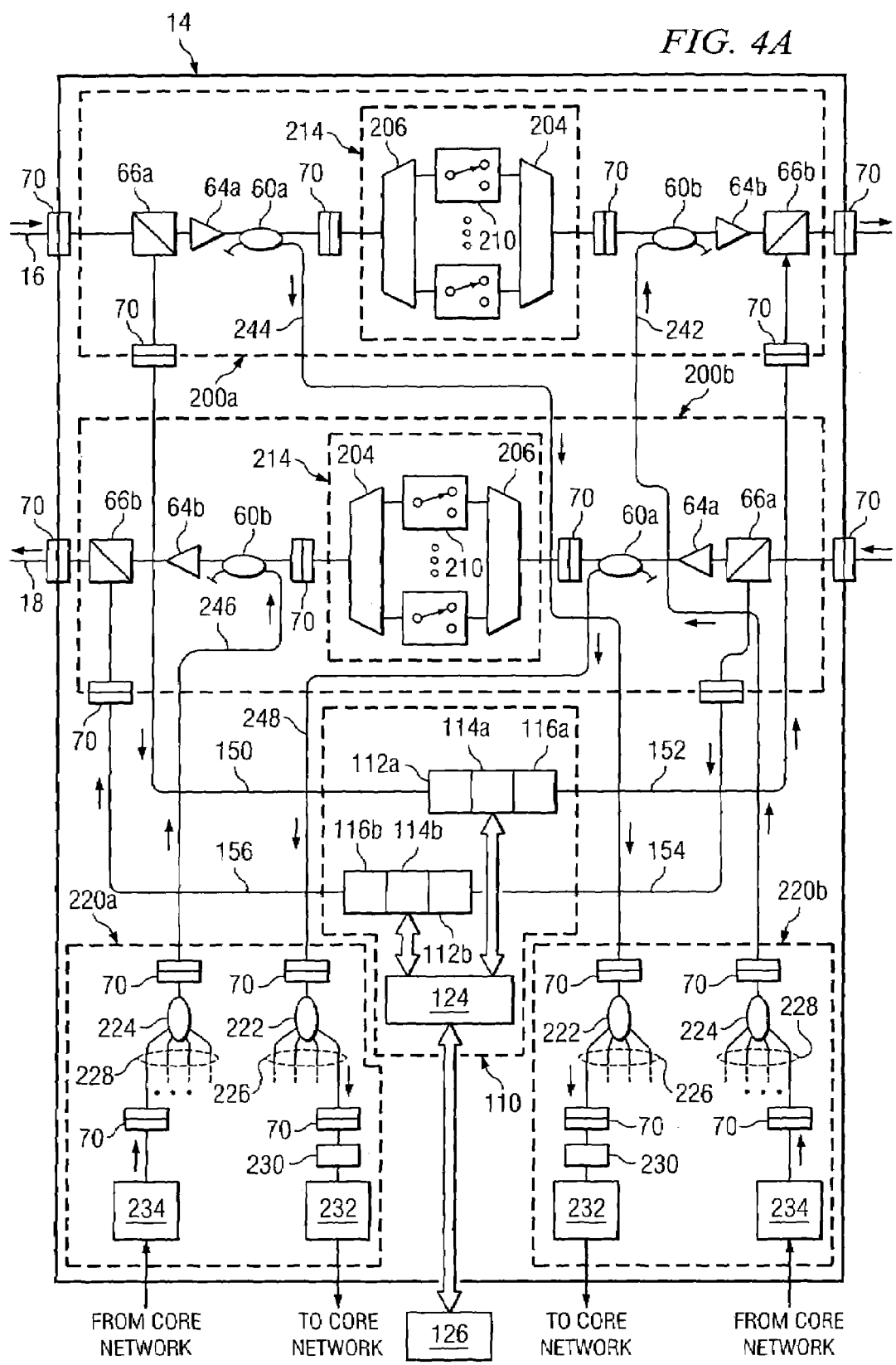
FIG. 4A is a block diagram illustrating details a hub node of the network of FIG. 1, in accordance with one embodiment of the present invention.

FIG. 4A is a block diagram illustrating details of hub node 14 of the network of FIG. 1 in accordance with one embodiment of the present invention. As previously described, hub node 14 is used to interconnect access nodes 12 with core network 12 and to selectively pass (along ring 16 and/or 18) or terminate traffic received from access nodes 12.

Hub node 14 includes a counterclockwise transport element 200a and a clockwise transport element 200b. Transport elements 200 each comprise a wavelength blocking unit 214. Wavelength blocking units 214 may each comprise a demultiplexer 206, a multiplexer 204, and switch elements which may comprise an array of switches 210 or other components operable to selectively forward or terminate a traffic channel (or group of channels). In a particular embodiment, multiplexers 204 and demultiplexers 206 may comprise arrayed waveguides. In another embodiment, the multiplexers 204 and the demultiplexers 206 may comprise fiber Bragg gratings, thin-film-based sub-band (a group of wavelengths which are a sub-set of the total wavelengths available) multiplexers/demultiplexers, or any other suitable devices. If a wavelength blocking unit 214 consists of sub-band mux/demux, the unit 214 is operable to block or forward sub-bands. The switches 210 may comprise 1×2 or other suitable switches, optical cross-connects, or other suitable components operable to selectively forward or terminate the demultiplexed traffic channels. Wavelength blocking units 214 may alternatively comprise any other components that are collectively operable to selectively block or forward individual channels or groups of channels.

Similarly to access nodes 12, hub node transport elements 200 also couplers 60, amplifiers 64, OSC filters 66, and connectors 70. In the illustrated embodiment, a coupler 60a is positioned prior to each wavelength blocking unit 214 and a coupler 60b is positioned after each wavelength blocking unit 214. Coupler 60a passively splits the signal from a pre-amplifier 64a into two generally identical signals: an through signal that is forwarded to wavelength blocking unit 214, and a drop signal that is forwarded to an associated network interconnection element 220. The split signals may be substantially identical in content, although power levels may differ. Coupler 60b passively combines a signal from wavelength blocking unit 214 with a signal from the respective network interconnection element 220. The combined signal is forwarded from the coupler 60b to a post-amplifier 64b.

The transport elements 200 are further operable to passively add and drop an OSC signal to and from rings 16 and 18, as with transport elements 50 of access nodes 12. More specifically, each transport element 200 includes an OSC ingress filter 66a that processes an ingress optical signal from its respective ring 16 or 18. Each OSC filter 66a filters the OSC signal from the optical signal and forwards the OSC signal to a respective OSC receiver 112. Each OSC filter 66a also forwards or lets pass the remaining transport optical signal to the associated pre-amplifier 64a. Pre-amplifier 64a amplifies the signal and forwards the signal to its associated coupler 60a.

Transport elements 200 also each include an OSC egress filter 66b that adds an OSC signal from an associated OSC transmitter 116 to the optical signal from post-amp 64b and forwards the combined signal as an egress transport signal to the associated ring 16 or 18 of network 10. The added OSC signal may be locally generated data or may be received OSC data passed through by the local EMS 124.

Network interconnection elements 220 each include a splitter 222 and a combiner 224. As with splitters 82 of access nodes 12, splitters 222 may comprise a coupler with one optical fiber ingress lead and a plurality of optical fiber egress leads which serve as drop leads 226. One or more of the drop leads 226 may each be connected to a filter 230, which in turn may be connected to an optical receiver 232. Each optical receiver 232 may be coupled to and communicate received traffic to core network 20. In particular embodiments, the connection between hub node 14 and core network 20 is a transparent optical connection (no optical-electrical-optical conversion is needed). In such embodiments, receivers 232 may be omitted.

Combiners 224 similarly may comprise a coupler with one optical fiber egress lead and a plurality of optical fiber ingress leads which serve as add leads 228. One or more of the add leads 228 may each be connected to an optical transmitter 234. One or more of the optical transmitters 234 may include one or more components for adjusting the optical output power from the transmitter 234, such as a manual variable optical attenuator. As described above, in particular embodiments the connection between hub node 14 and core network 20 is a transparent optical connection (no optical-electrical-optical conversion is needed). In such embodiments, transmitters 234 may be omitted.

Although the illustrated embodiment shows four drop leads 226 and four add leads 228, it should be understood that any appropriate number of drop leads 226 and add leads 228 may be implemented, as described in further detail below. Hub node 14 further comprises counterclockwise add fiber segment 242, counterclockwise drop fiber segment 244, clockwise add fiber segment 246, and clockwise drop fiber segment 248, which connect the couplers 60a and 60b to splitters 222 and combiners 224.

Similar to access nodes 12, hub node 14 comprises a management element 110 comprising OSC receivers 112, OSC interfaces 114, OSC transmitters 116, and an EMS 124 (which is coupled to NMS 126), as described above with reference to FIG. 2. The EMS 110 is connected to transport elements 200 via OSC fiber segments 150, 152, 154, and 156, again as described in reference to FIG. 2.

In operation, each transport element 200 receives a optical signal, comprising a plurality of channels, from its respective ring 16 or 18. OSC filter 66a filters the OSC signal from the optical signal as described above and the remaining optical signal is forwarded to amplifier 64a, which amplifies the signal and forwards it to coupler 60a. Coupler 60a passively splits the signal from the amplifier 64 into two generally identical signals: an through signal that is forwarded to wavelength blocking unit 214, and a drop signal that is forwarded to the associated network interconnection element 220. The split signals may be substantially identical in content, although power levels may differ.

Demultiplexer 206 of wavelength blocking unit 214 receives the optical signal from coupler 60a and demultiplexes the signal into its constituent channels. Switches 210 selectively terminate or forward each channel to multiplexer 204. As described below, channels may be selectively terminated or forwarded to implement protection schemes. The channels that are forwarded by switches 210 are received by multiplexer 204, which multiplexes the received channels into a WDM optical signal and forwards the optical signal to coupler 60b.

Splitter 222 of network interconnection element 220 also receives the optical signal from coupler 60a. Splitter 222 splits the dropped signal into multiple generally identical signals. One or more of the these signals are each forwarded to an optical filter 230 via a drop lead 236. Each drop lead 236 may have an associated filter 230 which allows only a particular wavelength (or group of wavelengths) to forward. Filters 230 may be implemented such that each filter allows a different channel (a filtered channel) to forward to an associated receiver 232 (if present). Such a configuration allows each receiver 232 that is associated with a particular network interconnection element 220 to receive a different wavelength. This, in turn, allows selected wavelengths to be forwarded to a receiver 232, and allows each such filtered wavelength to be dealt with differently, if appropriate. Receivers 232 each receive an optical signal and convert the optical signal into an electrical signal for transmission to an appropriate component associated with core network 20 (such as a transmitter). If there is a transparent optical connection between hub node 14 and core network 20, the filtered optical signal(s) may be communicated directly from one or more filters 230 to core network 20.

Conversely, each transmitter 234 receives traffic in the form of an electrical signal from one or more components of core network 20 and converts this electrical signal into an optical signal in a particular wavelength. Each of these optical signals in different wavelengths are communicated from the transmitters 234 of a particular network interconnection element 220 via add leads 228 to the combiner 224 of that network interconnection element 220. Alternatively, if hub node 14 is coupled to core network 20 via a transparent optical connection, then optical signals in various wavelengths may each be directly communicated to combiner 224 via add leads 228. Combiner 224 combines different the various signals from transmitters 234 and forwards the combined optical signal to coupler 60b of the associated transport element 200.

Coupler 60b passively combines the optical signal from the associated wavelength blocking unit 214 with the optical signal from the associated network interconnection element 220. The combined signal is forwarded from the coupler 60*b* to the associated post-amplifier 64*b*, where the combined optical signal is amplified. The amplified optical signal is then forwarded to OSC egress filter 66*b*, which adds an OSC signal from the associated OSC transmitter 116 to the combined optical signal and forwards the new combined signal as an egress transport signal to the associated ring 16 or 18 of network 10. The added OSC signal may be locally generated data or may be received OSC data forwarded through by the EMS 124.

Figure 4B:
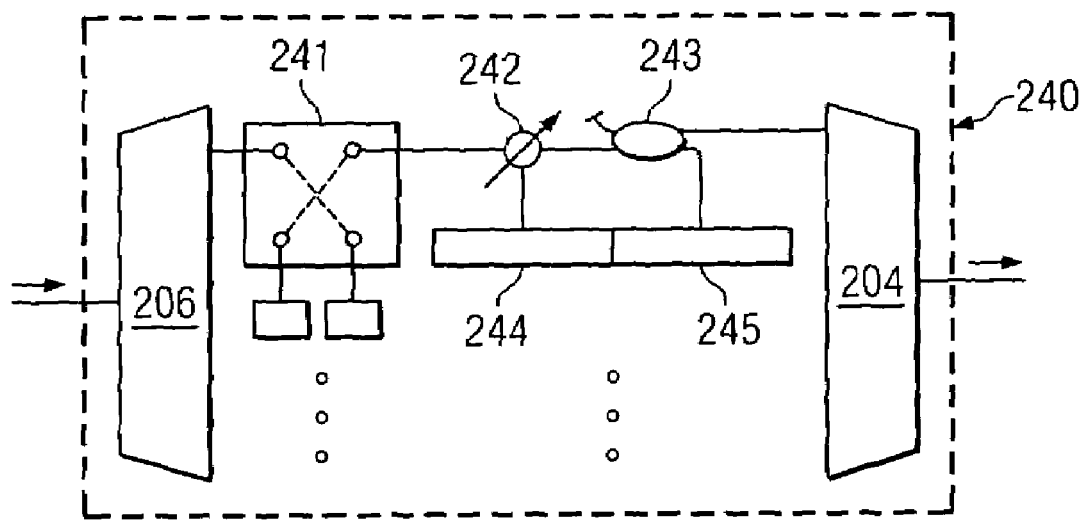
FIG. 4B is a block diagram illustrating an example wavelength blocking unit of the hub node of FIG. 4A in accordance with one embodiment of the present invention.

FIG. 4B is a block diagram illustrating an example wavelength blocking unit of hub node 14 in accordance with another embodiment of the present invention. In accordance with this embodiment, wavelength blocking unit 240 of FIG. 4B may be substituted for mux/demux modules 214 of FIG. 4A. Wavelength blocking unit 240 comprises demultiplexer 206 and multiplexer 204 as described above in reference to FIG. 4A. In place of the plurality of switches 210 are a plurality of 2×2 switch/attenuator sets each comprising 2×2 switch 241, variable optical attenuator (VOA) 242, optical splitter 243, photodetector 245, and controller 244. VOA 242 attenuates the ingress signal to a specified power level based on a feedback loop including splitter 243 which taps the signal, photodetector 245 which detects the power level of the signal and feedback controller 244 which controls VOA 244 based on the detected power level. In this way, the rings may be opened for a particular channel by switching the 2×2 switch to the "cross" position, and the power level of the "through" signal when the 2×2 switch is in the "through" position may be adjusted. Also, as described above, traffic may be added and/or dropped from the rings via the add and drop leads of 2×2 switches 241.

Figure 4C:
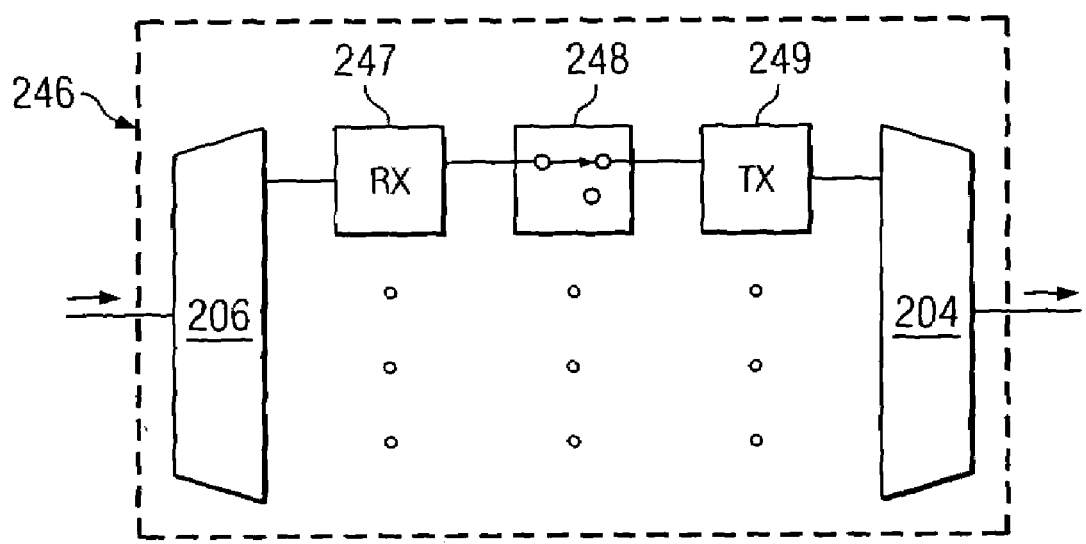
FIG. 4C is a block diagram illustrating another example wavelength blocking unit of the hub node of FIG. 4A in accordance with another embodiment of the present invention.

FIG. 4C is a block diagram illustrating an example wavelength blocking unit of hub node 14 in accordance with yet another embodiment of the present invention. In accordance with this embodiment, the unit is an optical-electrical-optical (O-E-O) unit. Unit 246 of FIG. 4C may be substituted for mux/demux modules 214 of FIG. 4A. O-E-O unit 246 comprises demultiplexer 206 and multiplexer 204 as described above in reference to FIG. 4A. In place of the plurality of switches 210 are a plurality of O-E-O elements, each comprising receivers 247, switches 248, and transmitters 249. A demultiplexed signal is passed to the receiver 247 corresponding to its channel, wherein the optical signal is converted to an electrical signal. Switches 248 are operable to selectively pass or terminate the electrical signal from receiver 247. A signal passed through via switch 248 is forwarded to transmitter 249, wherein the signal is converted to an optical signal. Optical signals from the plurality of transmitters 249 are multiplexed in multiplexer 204 and the multiplexed signal forwarded as described above in reference to FIG. 4A. Thus, O-E-O unit 246 may act as a regenerator of the signals passing through the gateway 14.

Figure 5:
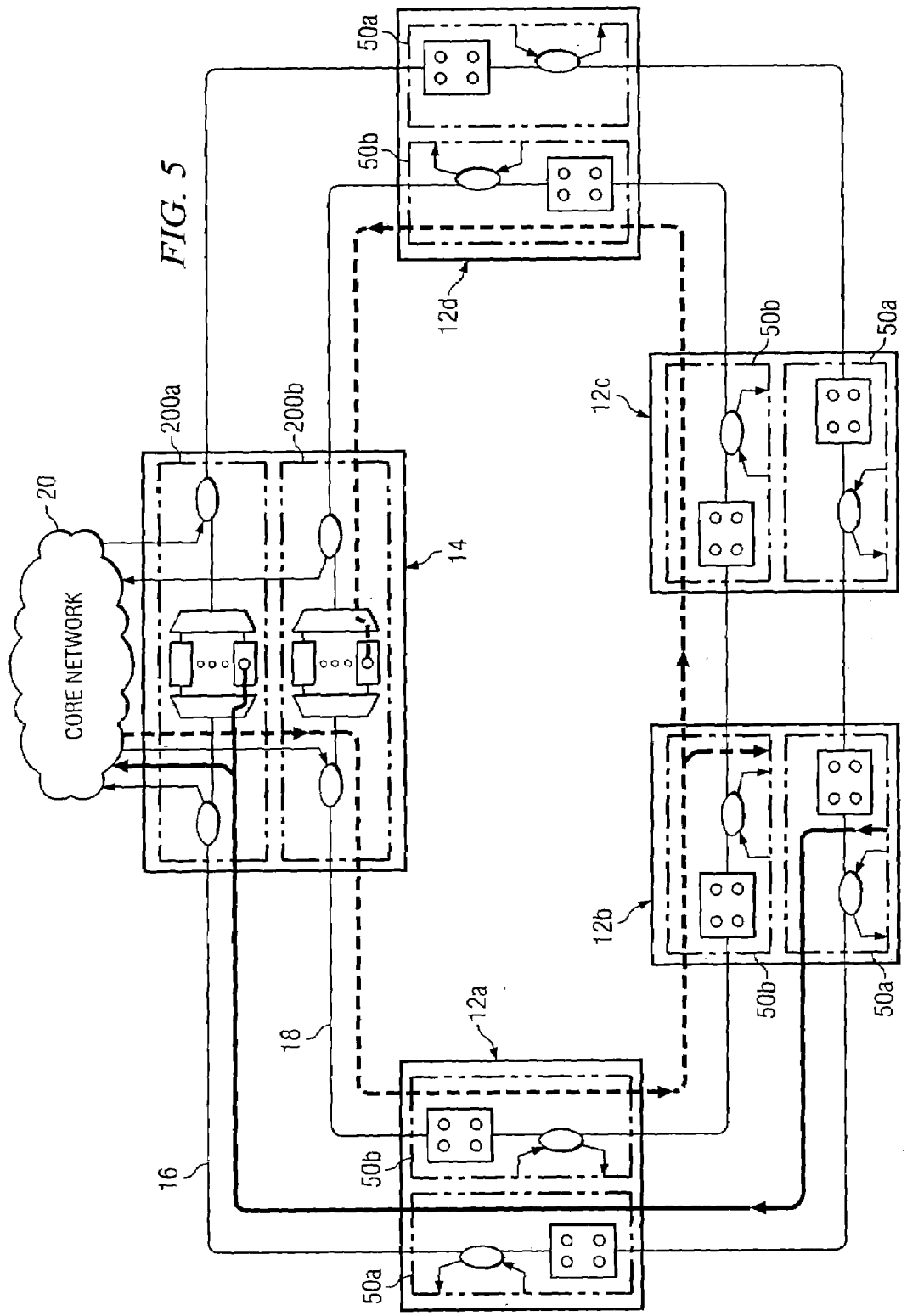
FIG. 5 is a block diagram illustrating example inter-network traffic streams in an example configuration of the optical network of FIG. 1, in accordance with one embodiment of the present invention.

FIG. 5 is a block diagram illustrating example internetwork traffic streams in an example configuration of the optical network of FIG. 1, in accordance with one embodiment of the present invention. For ease of reference in this and the following figures, only high-level details of access nodes 12 and hub nodes 14 are shown. In this example embodiment, a first traffic stream 300 is a clockwise stream communicated on ring 16 from access node 12*b* to core network 20 (via hub node 14). A second traffic stream 302 is a counter-clockwise stream communicated on ring 18 from core network 20 to access node 12*b* (via hub node 14). Therefore, traffic streams 300 and 302 represent two-way inter-network communications between access node 12*b* and core network 20. Although not illustrated, it should be understood that one or more other traffic streams may be communicated between access nodes 12 and core network 20.

Traffic stream 300 is originated in a first wavelength, $\lambda_1$, at access node 12*b* using a transmitter 104 associated with ring 16. Stream 300 is added to any existing optical signals on ring 16 via the coupler 60 of access node 12*b* that is associated with ring 16. Although only stream 300 is shown on ring 16, it should be understood that other traffic streams in other wavelengths may also be traveling around ring 16. After exiting access node 12*b*, stream 300 travels via ring 16 to access node 12*a*. The traffic stream 300 is not shown as being dropped by access node 12*a* because stream 300 is not destined for this node. However, it should be understood that coupler 60 of access node 12*a* both forwards stream 300 (along with the rest of the traffic on ring 16) and drops stream 300 (along with the other traffic). The filters 100 of the distributing/combining element 80 associated ring 16 are configured to filter out $\lambda_1$, as described above, since stream 300 is not destined for node 12*a*.

The forwarded copy of stream 300 is communicated around ring 16 to hub node 14. Coupler 60*a* of hub node 14 both drops and forwards traffic on ring 16 coming from access node 12*a* (including stream 300). Traffic stream 300 included in the traffic dropped from coupler 60*a* is passed by one of the filters 230 associated with the network interconnection element 220 of the hub node 14 (the filter is configured to forward $\lambda_1$). Dropped stream 300 is then either received by a receiver 232 and then forwarded to core network 20 as an electrical signal or is directly sent to core network 20 as an optical signal after passing through the filter 230.

The traffic forwarded from coupler 60*a* of hub node 14 is demultiplexed by demultiplexer 206 of hub node 14 into its constituent wavelengths, including stream 300 in $\lambda_1$. Demultiplexed stream 300 is forwarded from the demultiplexer 206 to its associated switch 210. The switch 210 is configured in the illustrated embodiment to terminate stream 300. Such termination is appropriate since traffic in stream 300 is destined for core network 20, to which this traffic has already been forwarded. This prevents stream 300 from traveling around ring 16 and reaching access node 12*b*, where it would interfere with the traffic originating from that node in the same wavelength.

Traffic stream 302 is originated in a second wavelength, $\lambda_2$, at hub node 14 using a transmitter 234 associated with ring 18 (alternatively, traffic stream 302 may be received as an optical signal from core network 20 with no transmitter 234 being required). The use of $\lambda_2$ is used as merely an example and for purposes of distinction. Stream 302 may be in the same or a different wavelength than stream 300. Furthermore, any other appropriate wavelengths may be used to transmit streams 300 and 302. Stream 302 is added to existing optical signals on ring 18 via the coupler 60*b* of hub node 14 that is associated with ring 18. Although only stream 302 is shown on ring 18, it should be understood that other traffic streams in other wavelengths may also be traveling around ring 18. After being added to ring 18 by coupler 60*b* of hub node 14, stream 302 travels via ring 18 to access node 12*a*.

Traffic stream 302 is not shown as being dropped by access node 12*a* because stream 302 is not destined for this node. However, it should be understood that coupler 60 of access node 12*a* both forwards stream 302 (along with the rest of the traffic on ring 18) and drops stream 302 (along with the other traffic). The filters 100 of the distributing/ combining element 80 associated with ring 18 are configured to filter out $\lambda_2$, as described above, since stream 302 is not destined for node 12a.

The forwarded copy of stream 302 is communicated from access node 12a around ring 18 to access node 12b. Coupler 60 of access node 12b both drops and forwards traffic on ring 18 coming from access node 12a (including stream 302). Traffic stream 302 included in the traffic dropped from coupler 60 is passed by one of the filters 100 associated with the distributing/combining element 80 of access node 12b (the filter is configured to forward $\lambda_2$). Dropped stream 302 is then received by a receiver 102 associated with the filter 100 and then forwarded to one or more clients of node 12b.

The traffic forwarded from coupler 60 of access node 12b, including stream 302, travels through access nodes 12c and 12d to hub node 14. The traffic stream 302 is not shown as being dropped by access nodes 12c and 12d because stream 302 is not destined for these nodes. However, it should be understood that coupler 60 of each of these access nodes both forwards stream 302 (along with the rest of the traffic on ring 18) and drops stream 302 (along with the other traffic). The filters 100 associated with each of these access nodes filter out $\lambda_2$, as described above, since stream 302 is not destined for these nodes.

Upon reaching hub node 14, coupler 60a of hub node 14 both drops and forwards traffic on ring 18 coming from access node 12d (including stream 302). The traffic dropped by coupler 60a is forwarded to a network interconnection element 220 associated with ring 18. The filters 230 of the network interconnection element 220 are configured to block $\lambda_2$ and thus block stream 302 from being forwarded to core network 20 (since it has reached its destination, node 12b, and so that it will not interfere with other traffic in core network 20).

The traffic forwarded from coupler 60a of hub node 14 is demultiplexed by demultiplexer 206 of hub node 14 into its constituent wavelengths, including stream 302 in $\lambda_2$. Demultiplexed stream 302 is forwarded from the demultiplexer 206 to its associated switch 210. The switch 210 is configured in the illustrated embodiment to terminate stream 302. Such termination is appropriate since traffic in stream 302 is destined for access node 12b, which it has already reached. This prevents stream 302 from reaching coupler 60a of hub node 14, where it would interfere with the traffic originating from core network 20 in the same wavelength.

In this manner, traffic can be communicated to each of the access nodes 12 from core network 20 (via hub node 14) and traffic can be communicated to core network 20 from each of the access nodes 12 (again, via hub node 14). Again, although only two traffic streams are illustrated, traffic may be communicated between each access node 12 and core network 20 via either ring 16 or 18. With respect to all of these traffic streams, the wavelength blocking units 214 of hub node 14 may be configured to block all wavelengths and thus prevent any traffic from passing through hub node 14 around either rings 16 or 18. This prevents recirculation of traffic in the network. However, if a fault occurs in one or both of rings 16 and 18 that interrupts streams 300 and 302 (or any other traffic in the network), a technique is needed to ensure that the content of the traffic is still received by the destination. Such a technique is described below.

Figure 6:
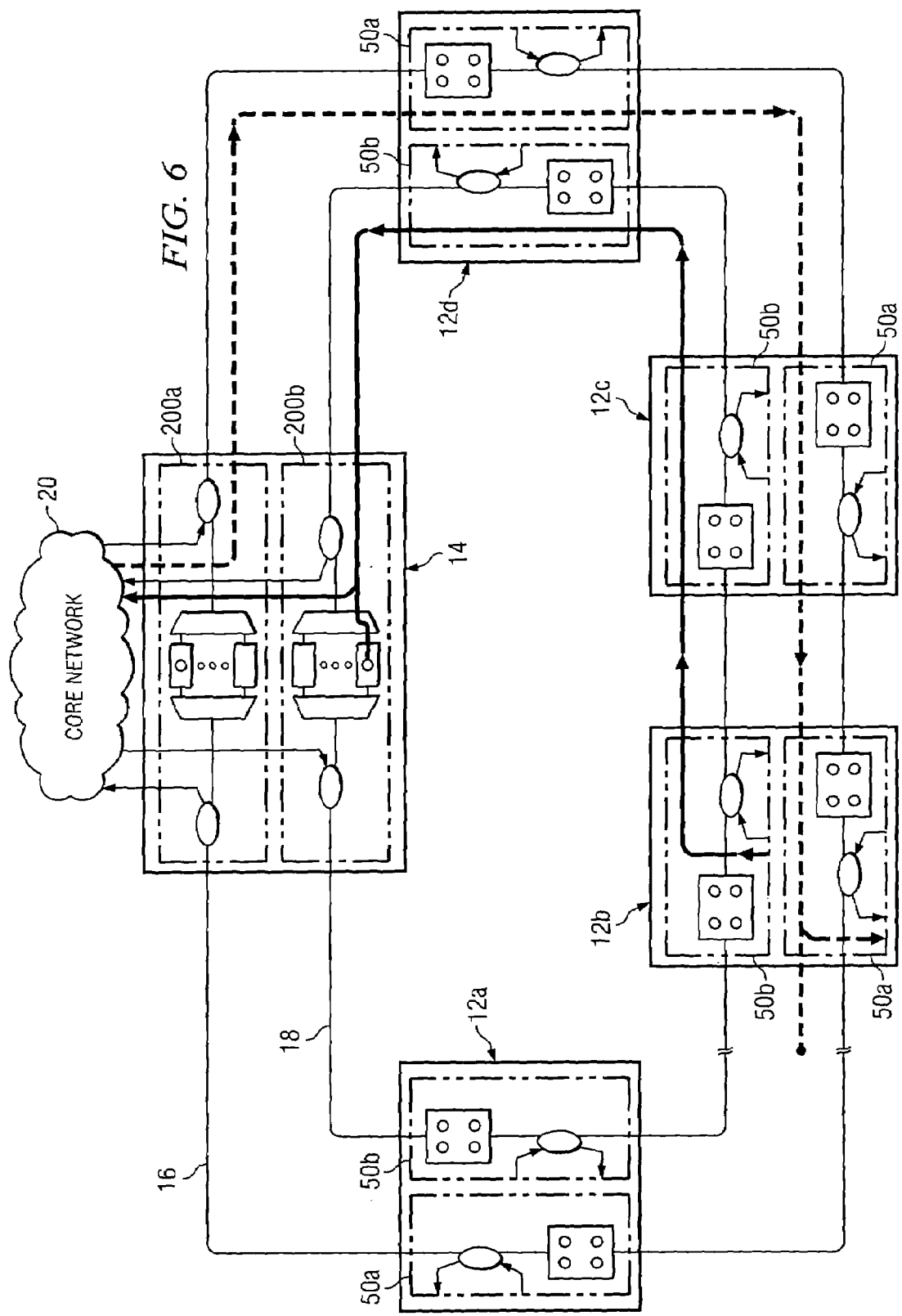
FIG. 6 is a block diagram illustrating protection switching and light path protection of the traffic streams in the network of FIG. 5, in accordance with one embodiment of the present invention.

FIG. 6 is a block diagram illustrating protection switching and light path protection of the traffic streams in the network of FIG. 5, in accordance with one embodiment of the present invention. In the illustrated example, a line cut 308 prevents traffic streams 300 and 302 illustrated in FIG. 5 from reaching their destination node. This problem may be detected by one or more nodes or other equipment in the network and may be reported to NMS 126. NMS 126 may direct, pursuant to the protection switching protocol of this embodiment, access node 12b to begin transmitting the content in stream 300 via ring 18 as stream 304 instead of or in addition to traffic stream 300 on ring 16 (which is blocked by line cut 308). Similarly, NMS 126 may direct hub node 14 to begin transmitting the content of stream 302 via ring 16 as stream 306 instead of or in addition to traffic stream 302 on ring 18 (which is also blocked by line cut 308). Therefore, traffic streams 304 and 306 continue to provide two-way communications between access node 12b and core network 20 in the event streams 300 and 302 are interrupted. Although not illustrated, it should be understood that one or more other traffic streams may be communicated between access nodes 12 and core network 20.

Traffic stream 304 is originated in a first wavelength, $\lambda_1$, at access node 12b using a transmitter 104 associated with ring 18 (although stream 304 need not necessarily be transmitted in the same wavelength as stream 300). Stream 304 is added to any existing optical signals on ring 18 via the coupler 60 of access node 12b that is associated with ring 18. Although only stream 304 is shown on ring 18, it should be understood that other traffic streams in other wavelengths are also traveling around ring 18.

The traffic forwarded from coupler 60 of access node 12b, including stream 304, travels through access nodes 12c and 12d to hub node 14. The traffic stream 304 is not shown as being dropped by access nodes 12c and 12d because stream 304 is not destined for these nodes. However, it should be understood that coupler 60 of each of these access nodes both forwards stream 304 (along with the rest of the traffic on ring 18) and drops stream 304 (along with the other traffic). The filters 100 associated with each of these access nodes filter out $\lambda_1$, as described above, since stream 304 is not destined for these nodes.

The forwarded copy of stream 304 is communicated from access node 12d around ring 18 to hub node 14. Coupler 60a of hub node 14 both drops and forwards traffic on ring 18 coming from access node 12d (including stream 304). Traffic stream 304 included in the traffic dropped from coupler 60a is passed by one of the filters 230 associated with the network interconnection element 220 of the hub node 14 (the filter is configured to forward $\lambda_1$). Dropped stream 304 is then either received by a receiver 232 and then forwarded to core network as an electrical signal or is directly sent to core network 20 as an optical signal after passing through the filter 230.

The traffic forwarded from coupler 60a of hub node 14 is demultiplexed by demultiplexer 206 of hub node 14 into its constituent wavelengths, including stream 304 in $\lambda_1$. Demultiplexed stream 304 is forwarded from the demultiplexer 206 to its associated switch 210. The switch 210 is configured in the illustrated embodiment to terminate stream 304. Such termination is appropriate since traffic in stream 304 is destined for core network 20, to which this traffic has already been forwarded. This prevents stream 304 from traveling around ring 18 and reaching access node 12b, where it would interfere with the traffic originating from that node in the same wavelength.

Traffic stream 306 is originated in a second wavelength, $\lambda_2$, at hub node 14 using a transmitter 234 associated with ring 16 (alternatively, traffic stream 306 may be received as an optical signal from core network 20 with no transmitter 234 being required). The use of $\lambda_2$ is used as merely an example and for purposes of distinction. Any other appropriate wavelengths may be used to transmit streams 304 and 306. Stream 306 is added to existing optical signals on ring 16 via the coupler 60b of hub node 14 that is associated with ring 16. Although only stream 306 is shown on ring 16, it should be understood that other traffic streams in other wavelengths are also traveling around ring 16.

The traffic forwarded from coupler 60b of hub node 14 on ring 16, including stream 306, travels through access nodes 12c and 12d to access node 12b. The traffic stream 306 is not shown as being dropped by access nodes 12c and 12d because stream 306 is not destined for these nodes. However, it should be understood that coupler 60 of each of these access nodes both forwards stream 306 (along with the rest of the traffic on ring 16) and drops stream 306 (along with the other traffic). The filters 100 associated with each of these access nodes filter out 2, as described above, since stream 306 is not destined for these nodes.

The forwarded copy of stream 306 is communicated from access node 12c on ring 16 to access node 12b. Coupler 60 of access node 12b both drops and forwards traffic on ring 16 coming from access node 12c (including stream 306). Traffic stream 306 included in the traffic dropped from coupler 60 is passed by one of the filters 100 associated with the distributing/combining element 80 of access node 12b (the filter is configured to forward $\lambda_2$). Dropped stream 306 is then received by a receiver 102 associated with the filter 100 and then forwarded to one or more clients of node 12b.

The traffic forwarded from coupler 60 of access node 12b, including stream 306, is interrupted by line cut 308 and thus does not reach access node 12a. However, the switch 210 associated with $\lambda_2$ in wavelength blocker 214 of hub node 14 associated with ring 16 is configured to block the traffic in $\lambda_2$ (like the wavelength blocker 214 associated with ring 18), so that once line cut 308 is repaired, stream 306 will not recirculate around ring 16 through hub node 14 back to node 12b. Once line cut 308 is repaired, streams 300 and 302 can be re-established (if they were terminated) and streams 304 and 306 can be terminated. In this manner, protection for streams 300 and 302 can be provided through the configuration of hub node 14 and access nodes 12 such that the content of these streams can reach its destination even if there is a break or other error in rings 16 or 18.

Figure 7:
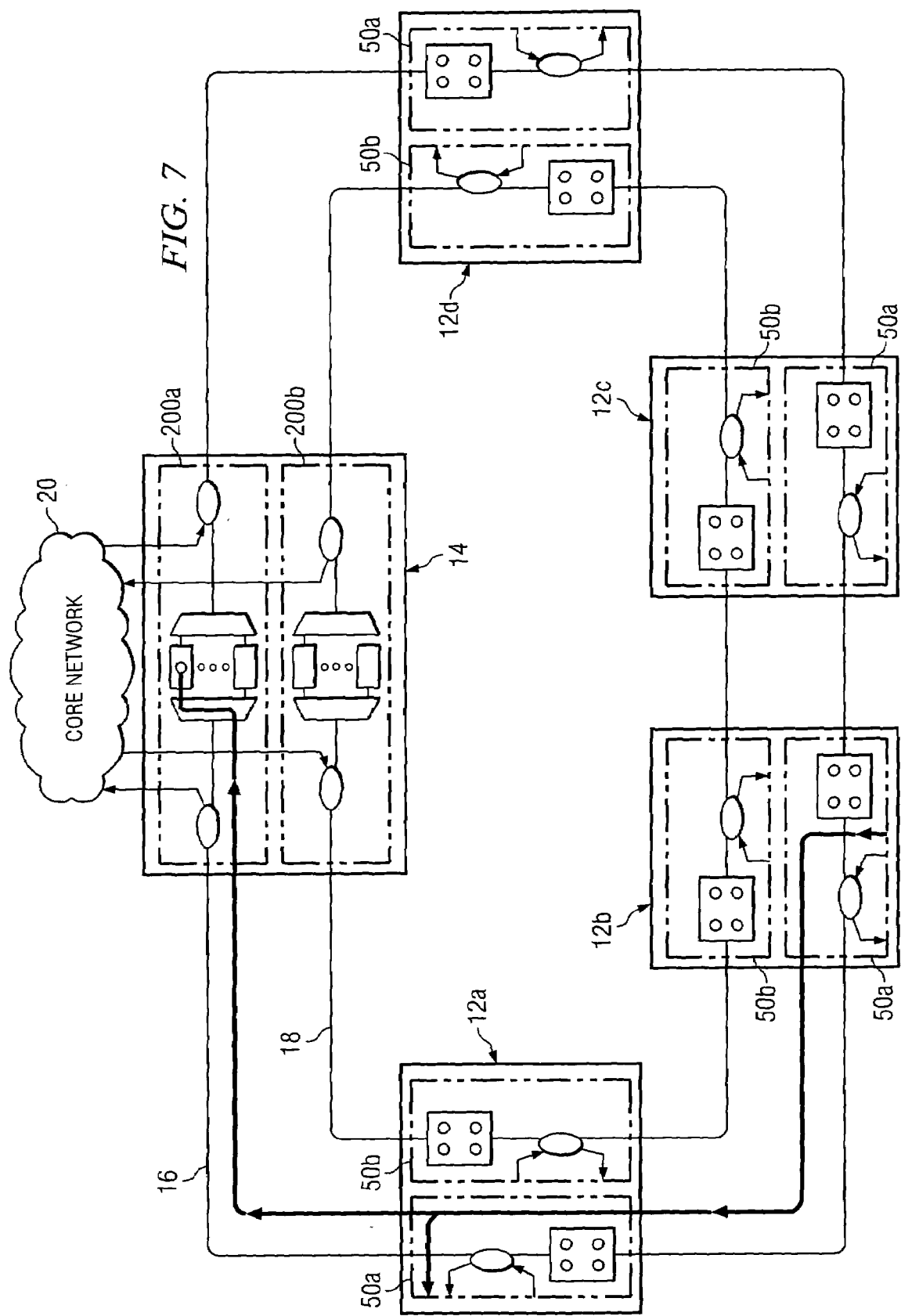
FIG. 7 is a block diagram illustrating an example intra-network traffic stream in an example configuration of the optical network of FIG. 1, in accordance with one embodiment of the present invention.

FIG. 7 is a block diagram illustrating an example intra-network traffic stream in an example configuration of the optical network of FIG. 1, in accordance with one embodiment of the present invention. In this example embodiment, a traffic stream 310 is a clockwise stream communicated on ring 16 from access node 12b to access node 12a. Thus this is an intra-network (access node to access node) traffic stream. Although not illustrated, it should be understood that one or more other traffic streams may be communicated between access nodes 12.

Traffic stream 310 is originated in a first wavelength, $\lambda_1$, at access node 12b using a transmitter 104 associated with ring 16 (although stream 310 may be transmitted in any other wavelength). Stream 310 is added to any existing optical signals on ring 16 via the coupler 60 of access node 12b that is associated with ring 16 and is thus forwarded to access node 12a. Coupler 60 of access node 12a both drops and forwards traffic on ring 16 coming from access node 12b (including stream 310). Traffic stream 310 included in the traffic dropped from coupler 60 is passed by one of the filters 100 associated with the distributing/combining element 80 of access node 12a (the filter is configured to forward $\lambda_1$). Dropped stream 310 is then received by a receiver 102 associated with the filter 100 and then forwarded to one or more clients of node 12a.

The forwarded copy of stream 310 is communicated from coupler 60 of access node 12a around ring 16 to hub node 14. Coupler 60a of hub node 14 both drops and forwards traffic on ring 16 coming from access node 12a (including stream 310). The traffic dropped by coupler 60a is forwarded to a network interconnection element 220 associated with ring 16. The filters 230 of the network interconnection element 220 are configured to block $\lambda_1$ and thus block stream 310 from being forwarded to core network 20 (since it has reached its destination, node 12a, and so that it will not interfere with other traffic in core network 20).

The traffic forwarded from coupler 60a of hub node 14 is demultiplexed by demultiplexer 206 of hub node 14 into its constituent wavelengths, including stream 310 in $\lambda_1$. Demultiplexed stream 310 is forwarded from the demultiplexer 206 to its associated switch 210. The switch 210 is configured in the illustrated embodiment to terminate stream 310. Such termination is appropriate since traffic in stream 310 is destined for access node 12a, which it has already reached. This prevents stream 310 from continuing around ring 16 through hub node 14 and reaching access node 12b, where it would interfere with the traffic originating from access node 12b in the same wavelength.

In this manner, intra-network traffic can be communicated between two access nodes 12. Again, although only a single traffic stream is illustrated, one or more traffic streams may be communicated between any two access nodes 12. With respect to all of these traffic streams, the wavelength blocking units 214 of hub node 14 may be configured to block all wavelengths and thus prevent any traffic from passing through hub node 14 around either rings 16 or 18. This prevents recirculation of traffic in the network. In such embodiments, traffic between access nodes 12 should be communicated on the ring 16 or 18 that allows the traffic to be communicated without having to pass through hub node 14. However, if a fault occurs in one or both of rings 16 and 18 that interrupts stream 310 (or any other traffic in the network), a technique is needed to protect this traffic to ensure that the content of the traffic is still received by the destination. Such a technique is described below.

Figure 8:
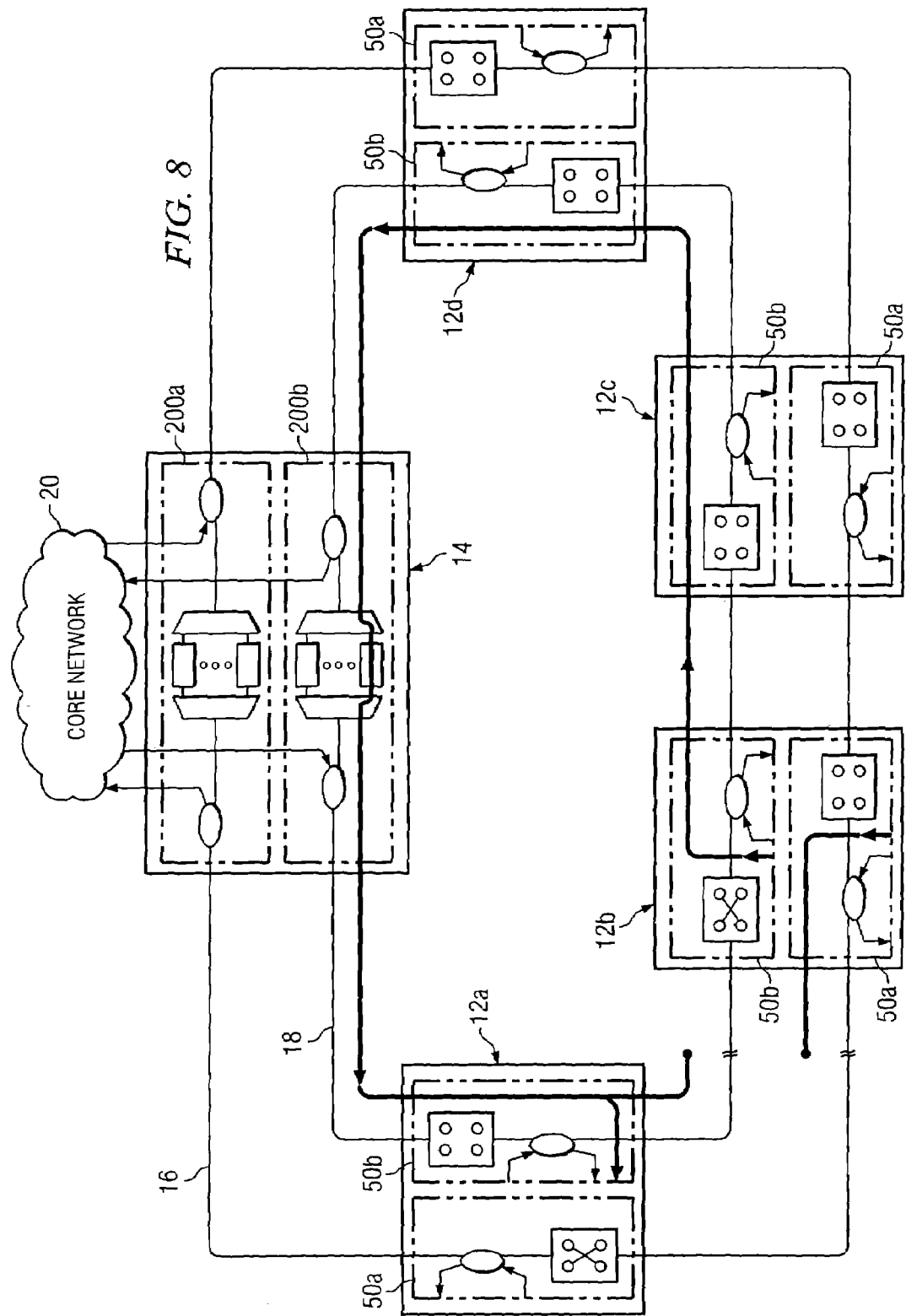
FIG. 8 is a block diagram illustrating protection switching and light path protection of the traffic stream in the network of FIG. 7, in accordance with one embodiment of the present invention.

FIG. 8 is a block diagram illustrating protection switching and light path protection of the traffic stream in the network of FIG. 7, in accordance with one embodiment of the present invention. In the illustrated example, a line cut 314 prevents traffic stream 310 illustrated in FIG. 7 from reaching its destination node. This problem may be detected by one or more nodes or other equipment in the network and may be reported to NMS 126. NMS 126 may direct, pursuant to the protection switching protocol of this embodiment, access node 12b to begin transmitting the content of stream 310 via ring 18 as stream 312 instead of or in addition to traffic stream 310 on ring 16 (which is blocked by line cut 314). In the illustrated embodiment, access node 12b continues to transmit stream 310 while it transmits stream 312. Although not illustrated, it should be understood that one or more other traffic streams may be communicated between access nodes 12.

Traffic stream 312 is originated in a first wavelength, $\lambda_1$, at access node 12b using a transmitter 104 associated with ring 18 (although stream 312 need not necessarily be transmitted in the same wavelength as stream 310). Stream 312 is added to any existing optical signals on ring 18 via the coupler 60 of access node 12b that is associated with ring 18. Although only stream 312 is shown on ring 18, it should be understood that other traffic streams in other wavelengths are also traveling around ring 18.

The traffic forwarded from coupler 60 of access node 12b, including stream 312, travels through access nodes 12c and 12d to hub node 14. The traffic stream 312 is not shown as being dropped by access nodes 12c and 12d because stream 312 is not destined for these nodes. However, it should be understood that coupler 60 of each of these access nodes both forwards stream 312 (along with the rest of the traffic on ring 18) and drops stream 312 (along with the other traffic). The filters 100 associated with each of these access nodes filter out $\lambda_1$, as described above, since stream 312 is not destined for these nodes.

The forwarded copy of stream 312 is communicated from access node 12d around ring 18 to hub node 14. Coupler 60a of hub node 14 both drops and forwards traffic on ring 18 coming from access node 12d (including stream 312). The traffic dropped by coupler 60a is forwarded to a network interconnection element 220 associated with ring 18. The filters 230 of the network interconnection element 220 are configured to block $\lambda_1$ and thus block stream 312 from being forwarded to core network 20 (so that it will not interfere with other traffic in core network 20).

The traffic forwarded from coupler 60a of hub node 14 is demultiplexed by demultiplexer 206 of hub node 14 into its constituent wavelengths, including stream 312 in $\lambda_1$. Demultiplexed stream 312 is forwarded from the demultiplexer 206 to its associated switch 210. The switch 210 is configured in the illustrated embodiment to forward stream 312. Such forwarding is appropriate since traffic in stream 312 is destined for access node 12a, which this traffic has not yet reached. Stream 312 is combined with any other streams passing through the associated wavelength blocking unit 214 by multiplexer 204 and the combined signal is forwarded to access node 12a.

Coupler 60 of access node 12a both drops and forwards traffic on ring 18 coming from hub node 14 (including stream 312). Traffic stream 312 included in the traffic dropped from coupler 60 is passed by one of the filters 100 associated with the distributing/combining element 80 of access node 12a (the filter is configured to forward $\lambda_1$). Dropped stream 312 is then received by a receiver 102 associated with the filter 100 and then forwarded to one or more clients of node 12a.

The traffic forwarded from coupler 60 of access node 12a, including stream 312, travels on ring 18 until is reached line cut 314, where it is blocked. However, switch 62 of node 12b associated with ring 18 is also opened to prevent stream 312 from reaching coupler 60 of access node 12b once line cut 314 is repaired, where it would interfere with the traffic originating from that node in the same wavelength. Similarly, switch 62 of node 12a associated with ring 16 is also opened to prevent the recirculation of stream 310 once line cut 314 is repaired. Such a configuration of this switch 62 of node 12a is needed in embodiments in which the switch 210 of wavelength blocking unit 214 of hub node 14 that is associated with $\lambda_1$ on ring 16 is configured to let $\lambda_1$ pass. Such a configuration may be useful since this is the configuration of the corresponding switch 210 of the wavelength blocking unit 214 associated with ring 18 (as described above), thus eliminating the need to configure these units 214 differently. However, in some embodiments, the switch 210 of the wavelength blocking unit 214 associated with ring 16 may be configured to terminate $\lambda_1$, thus eliminating the need to open switch 62 of access node 12a.

Once line cut 314 is repaired, switches 62 of access nodes 12a and 12b can be closed and the switches 210 of the wavelength blocking units 214 associated with rings 16 and 18 can be configured to block $\lambda_1$ and thus block stream 310, as described above in FIG. 7. Therefore, communications from access node 12b to access node 12a can be re-established via stream 310 and stream 312 can be terminated. In this manner, protection for stream 310 can be provided through the configuration of hub node 14 and access nodes 12 such that the content of this stream can reach its destination even if there is a break or other error in rings 16 or 18.

Although the present invention has been described with several embodiments, various changes and modifications may be suggested to one skilled in the art. It is intended that the present invention encompass such changes and modifications as fall within the scope of the appended claims.

What is claimed is:

1. An optical access network, comprising:
a first ring operable to communicate optical signals in a first direction and a second ring operable to communicate optical signals in a second, opposite direction;
one or more access nodes coupled to each ring and operable to passively add and drop traffic to and from each ring in one or more wavelengths, wherein at least a first access node is operable to add traffic in at least a first wavelength of a first optical signal communicated on the first ring;
a hub node coupled to each ring and also coupled to an optical core network, the hub node comprising one or more components configured to:
receive the first optical signal on the first ring;
forward a first copy of the first optical signal to a first wavelength blocking unit of the hub node associated with the first ring, the first wavelength blocking unit configured to selectively forward or terminate the traffic in each wavelength of the first optical signal, wherein the traffic in the first wavelength is terminated; and
forward a second copy of the first optical signal to a first network interconnection element of the hub node associated with the first ring, the first network interconnection element configured to selectively forward to the core network or terminate the traffic in each wavelength of the first optical signal, wherein the traffic in the first wavelength is forwarded to the core network;
the first access node comprising logic embodied on a computer-readable medium and operable to configure the first access node upon detection of an interruption of the traffic in the first wavelength on the first ring to add the traffic in a second wavelength of a second optical signal communicated on the second ring; and
the hub node comprising logic embodied on a computer-readable medium and operable to configure the hub node upon detection of an interruption to:
receive the second optical signal on the second ring;
forward a first copy of the second optical signal to a second wavelength blocking unit of the hub node associated with the second ring, wherein the traffic in the second wavelength is terminated; and
forward a second copy of the second optical signal to a second network interconnection element of the hub node associated with the second ring, wherein the traffic in the second wavelength is forwarded to the core network.

2. The optical network of claim 1, wherein the first wavelength is the same wavelength as the second wavelength.

3. The optical network of claim 1, wherein the first wavelength is a different wavelength than the second wavelength.

4. The optical network of claim 1, wherein each access node is operable to add and drop traffic independent of the channel spacing of the traffic.

5. The optical network of claim 1, wherein each access node comprises a single optical coupler operable to passively add and drop traffic.

6. The optical network of claim 1, wherein each access node comprises a first optical coupler operable to passively add traffic and a second optical coupler operable to passively drop traffic.

7. The optical network of claim 1, wherein the hub node comprises:
 a first optical coupler associated with each ring operable to receive an optical signal on the ring, to forward a first copy of the optical signal to the associated wavelength blocking unit, and to forward a second copy of the optical signal to the associated network interconnection element; and
 a second optical coupler associated with each ring operable to receive an optical signal from the core network and to add the optical signal to the associated ring.

8. The optical network of claim 7, wherein each network interconnection element of the hub node comprises:
 a splitter operable to receive and make a plurality of copies of the second copy of the optical signal received from the associated first optical coupler; and
 one or more filters each operable to receive one of the plurality of copies of the second copy and to forward the traffic in one or more wavelengths of the associated copy for communication to the core network.

9. The optical network of claim 7, wherein each wavelength blocking unit of the hub node comprises:
 a demultiplexer operable to receive and demultiplex the first copy of the optical signal received from the associated first optical coupler into a plurality of constituent wavelengths;
 a plurality of switches, each switch operable to receive and selectively forward or terminate the traffic in an associated wavelength received from the demultiplexer; and
 a multiplexer operable to combine the traffic in the forwarded wavelengths and to communicate the combined traffic to the second optical coupler.

10. A method for protecting traffic in an optical access network having a first ring and a second ring carrying optical signals in opposite directions, the network comprising a plurality of access nodes coupled to each ring and operable to passively add and drop traffic to and from each ring in one or more wavelengths, the network further comprising a hub node coupled to each ring and also coupled to an optical core network, the method comprising:
 at a first access node, adding traffic in at least a first wavelength of a first optical signal communicated on the first ring;
 at the hub node:
  receiving the first optical signal on the first ring;
  forwarding a first copy of the first optical signal to a first wavelength blocking unit of the hub node associated with the first ring that is operable to selectively forward or terminate the traffic in each wavelength of the first optical signal, wherein the traffic in the first wavelength is terminated; and
  forwarding a second copy of the first optical signal to a first network interconnection element of the hub node associated with the first ring that is operable to selectively forward to the core network or terminate the traffic in each wavelength of the first optical signal, wherein the traffic in the first wavelength is forwarded to the core network;
 upon detection of an interruption of the traffic in the first wavelength on the first ring, adding the traffic in a second wavelength of a second optical signal communicated on the second ring at the first access node; and
 upon detection of the interruption, at the hub node:
  receiving the second optical signal on the second ring;
  forwarding a first copy of the second optical signal to a second wavelength blocking unit of the hub node associated with the second ring, wherein the traffic in the second wavelength is terminated; and
  forwarding a second copy of the second optical signal to a second network interconnection element of the hub node associated with the second ring, wherein the traffic in the second wavelength is forwarded to the core network, thereby protecting the traffic despite the interruption.

11. The method of claim 10, wherein the first wavelength is the same wavelength as the second wavelength.

12. The method of claim 10, wherein the first wavelength is a different wavelength than the second wavelength.

13. The method of claim 10, wherein each access node adds and drops traffic independent of the channel spacing of the traffic.

14. The method of claim 10, wherein forwarding first and second copies of an optical signal at the hub node comprises:
 receiving the optical signal at a first optical coupler associated with the ring on which the optical signal is communicated;
 forwarding a first copy of the optical signal from the first optical coupler to the associated wavelength blocking unit; and
 forwarding a second copy of the optical signal from the first optical coupler to the associated network interconnection element.

15. The method of claim 14, further comprising receiving an optical signal from the core network at a second optical coupler associated with one of the rings and adding the optical signal to the associated ring using the second optical coupler.

16. The method of claim 15, wherein selectively forwarding or terminating the traffic in each wavelength at each wavelength blocking unit of the hub node comprises:
 at a demultiplexer, demultiplexing the first copy of the optical signal received from the associated first optical coupler into a plurality of constituent wavelengths;
 at each of a plurality of switches, selectively forwarding or terminating the traffic in an associated wavelength received from the demultiplexer; and
 at a multiplexer, combining the traffic in the forwarded wavelengths and communicating the combined traffic to the second optical coupler.

17. The method of claim 14, wherein selectively forwarding to the core network or terminating the traffic in each wavelength at each network interconnection element of the hub node comprises:
 at a splitter, making a plurality of copies of the second copy of the optical signal received from the associated first optical coupler; and
 at one or more filters, receiving one of the plurality of copies of the second copy and forwarding the traffic in one or more wavelengths of the associated copy for communication to the core network.

* * * * *

UNITED STATES PATENT AND TRADEMARK OFFICE
CERTIFICATE OF CORRECTION

PATENT NO.       : 7,120,360 B2
APPLICATION NO.  : 11/031639
DATED            : September 20, 2006
INVENTOR(S)      : Cechan Tian et al.

Page 1 of 1

It is certified that error appears in the above-identified patent and that said Letters Patent is hereby corrected as shown below:

Title Page 2, Other Publications, Right Column, Line 15, after "America, Inc., 3 pages" insert -- , February 24-26, 2004. --.
Column 15, Line 15, after "filter out" delete "2" and insert -- $\lambda_2$ --.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,120,360 B2 |
| APPLICATION NO. | : 11/031639 |
| DATED | : October 10, 2006 |
| INVENTOR(S) | : Cechan Tian et al. |

It is certified that error appears in the above-identified patent and that said Letters Patent is hereby corrected as shown below:

Title Page 2, Other Publications, Right Column, Line 15, after "America, Inc., 3 pages" insert -- , February 24-26, 2004. --.
Column 15, Line 15, after "filter out" delete "2" and insert -- $\lambda_2$ --.

This certificate supersedes the Certificate of Correction issued April 21, 2009.

Signed and Sealed this

Twelfth Day of May, 2009

JOHN DOLL
*Acting Director of the United States Patent and Trademark Office*